United States Patent
Sriram et al.

(10) Patent No.: US 6,539,059 B1
(45) Date of Patent: Mar. 25, 2003

(54) APPARATUS AND METHOD FOR EFFICIENTLY SCALABLE DIGITAL VIDEO DECODING

(75) Inventors: Parthasarathy Sriram, San Jose, CA (US); Subramania I. Sudharsanan, Union City, CA (US); Amit Gulati, Santa Clara, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/518,455

(22) Filed: Mar. 2, 2000

(51) Int. Cl.[7] ................................................. H04N 7/12
(52) U.S. Cl. ................................................. 375/240.25
(58) Field of Search ....................... 375/240.09, 240.25, 375/240.28; 382/233–234, 240; 709/400, 101, 106; 712/28, 25, 32, 208, 212; 348/425.1, 425.4, 725, 728

(56) References Cited

U.S. PATENT DOCUMENTS 6,061,709 A * 5/2000 Bronte ........................ 709/103
6,148,032 A * 11/2000 Pearlstein et al. ..... 375/240.15
6,229,854 B1 * 5/2001 Kikuchi et al. ........ 375/240.27
6,275,536 B1 * 8/2001 Chen et al. ............ 375/240.25

* cited by examiner

Primary Examiner—Vu Le
(74) Attorney, Agent, or Firm—Pennie & Edmonds LLP (57) ABSTRACT

An apparatus for decoding a Motion Compensated-Discrete Cosine Transform (MC-DCT) video stream includes an input port to receive an MC-DCT video stream with an associated hierarchy of data structures including a sequence data structure, a picture data structure, a slice data structure, and a macroblock data structure. A monitor processor splits the MC-DCT video stream into a set of video streams. A set of sub-processors processes the set of video streams. Each sub-processor has an assigned computational task performed on a specified hierarchical level of the associated hierarchy of data structures. Each sub-processor performs the assigned computational task with a designated data structure including all parameter data required at the specified hierarchical level.

15 Claims, 2 Drawing Sheets

APPARATUS AND METHOD FOR EFFICIENTLY SCALABLE DIGITAL VIDEO DECODING

BRIEF DESCRIPTION OF THE INVENTION

This invention relates generally to digital video signal processing. More particularly, this invention relates to a technique for efficiently scalable digital video decoding of a Motion Compensated-Discrete Cosine Transform (MC-DCT) video signal.

BACKGROUND OF THE INVENTION

Many video applications utilize data compression. More particularly, many video applications utilize transform code compressed domain formats, which include the Discrete Cosine Transform (DCT) format, the interframe predictive code format, such as the Motion Compensation (MC) algorithm, and hybrid compressed formats. The combination of Motion Compensation and Discrete Cosine Transform (MC-DCT) is used in a number of standards, including: MPEG-1, MPEG-2, MPEG-4, H.261, and H.263. Although the present invention is disclosed in the context of MPEG-1 and MPEG-2 decoders for the purpose of illustration, the present invention is equally applicable to any other MC-DCT scheme.

The MPEG-2 video coder is used in a variety of applications, including: (1) medium resolution video conferencing applications, where the resolution of the video frames is 352×288 pixels; (2) Standard Definition Digital Television (SDTV) (720×480/576 pixels); and (3) High Definition Digital Television (HDTV) (1980×1080 pixels). It is not necessary for a single implementation of a digital video decoder to support all the resolutions, formats and bit-rates that are required by all the video applications which use a particular video algorithm. Nevertheless, it would be highly desirable if both hardware and software based implementations could be easily and efficiently scaled so that a wide range of applications could be supported. There are several design goals which should be addressed for this type of scalability to be achieved.

One design goal is efficiency. In particular, it is important to efficiently process shared parameters in a bit stream. All the known video standards have some syntactic elements to allow the bit stream to be split into multiple independent parts. For example, an MPEG-2 video bit stream can use slice headers to identify portions of a video frame which can be independently processed. A limitation on the splitting of the bit stream is that the information in the bit stream is part of the same video frame and hence, a wide range of parameters are shared with the rest of the video frame. If the access pattern to shared parameters is not properly moderated, individual decoders are stalled, resulting in a drop in the efficiency of the overall implementation. Therefore, it is important to efficiently share parameters in a video bit stream that has been split into independent parts.

A second design goal is synchronization. In particular, it is necessary to observe the inherent sequential constraints associated with a bit stream. Even though the syntax of the video bit stream may allow decoding to be split into multiple independent parts, there is still an inherent sequential constraint in the decoding process. For example, if the decoding process is split into multiple independent portions, a monitor program (e.g., an Operating System (OS) or a state machine) needs to ensure that all the individual decoders complete their task before the display processing can be initiated. If the monitor task does not ensure that the individual decoders have completed their processing before starting the display process, an incomplete video frame is displayed at the output. Hence, synchronization is a very critical task in this multi-processing environment. The number of synchronization points in this scenario is also a very critical parameter. As an example, if the decoding process is split into a Bitstream Decoding and Inverse Quantization process (BDIQ), an Inverse Discrete Cosine Transform process (IDCT), and a Motion Compensation and Write Back process (MCWB), the IDCT process cannot start before the BDIQ process ends and the MCBW process cannot start before the IDCT process ends. If synchronization is needed multiple times at the block and the Macroblock (a group of blocks) level, the implementation will not be very efficient. Therefore, a system is needed in which processing improvements are realized, while sequential constraints are observed.

A third design goal is scalability. The decoding process should have the ability to be split into a wide range of independent sub-processes. This puts a constraint on how the decoding process has to be split. For example, typical hardware for MPEG-2 video decoding splits the decoding process into three or more parts: BDIQ, IDCT and MCBW. Splitting the video decoding process into these three processes in a multi-process environment will give no more than a factor of three improvement (ignoring the synchronization effects) in a uni-processor environment. Such an improvement is not sufficient, for example, if one needs to scale an SDTV Video decoder to an HDTV video decoder. Thus, it is important to improve the partition of sub-processes so that a system can be truly scalable.

A fourth design goal is flexibility. It is very advantageous if the decoding process can be dynamically partitioned into individual sub-processes. Such a partition allows a better use of the system resources. For example, in a typical video application, the video decoding process is associated with audio decoding and a system stream demultiplexing process. While these two processes have the same or higher priority than the accompanying video process, their processing requirements are a lot smaller than the video process. Instead of statically dedicating some hardware to do the audio and the system tasks, it is more economical to give these tasks a higher priority so that these tasks are completed in time and the resources they are using can then be used by the video process. Thus, it is highly desirable to provide a system in which bandwidth can be assigned to more computationally intensive tasks.

A fifth design goal is additional functionality. Having the flexibility of making all the video and its accompanying processes work in an asynchronous manner and synchronizing only when needed, facilitates the support of additional functions. For example, by properly isolating the video frame decoding and display processes, the decoding delay and hence the number of video frames that have to be buffered in memory can be more efficiently controlled. Therefore, it is important to provide a system that operates asynchronously when such operation can be exploited to achieve additional functions.

In view of the foregoing, it would be highly desirable to provide a technique for efficiently scalable digital video decoding which facilitates the efficiency, synchronization, scalability, flexibility, and extended functionality goals set forth above.

SUMMARY OF THE INVENTION

The invention includes an apparatus for decoding a Motion Compensated-Discrete Cosine Transform (MC- DCT) video stream. The apparatus includes an input port to receive an MC-DCT video stream with an associated hierarchy of data structures including a sequence data structure, a picture data structure, a slice data structure, and a macroblock data structure. A monitor processor splits the MC-DCT video stream into a set of video streams. A set of sub-processors processes the set of video streams. Each sub-processor has an assigned computational task performed on a specified hierarchical level of the associated hierarchy of data structures. Each sub-processor performs the assigned computational task with a designated data structure including all parameter data required at the specified hierarchical level.

In another aspect of the invention, an apparatus includes an input port to receive an MC-DCT video stream with an associated hierarchy of data structures including a sequence data structure, a picture data structure, a slice data structure, and a macroblock data structure. A monitor processor splits the MC-DCT video stream into a set of video streams. A set of sub-processors processes the set of video streams. Each sub-processor has an assigned computational task performed on a specified hierarchical level of the associated hierarchy of data structures. A synchronous processor combines the set of video streams received from the set of sub-processors. The synchronous processor ensures that parameters produced by a sub-processor associated with a lower hierarchical level of the hierarchy of data structures are final prior to combining the parameters with values produced by a sub-processor at a higher hierarchical level of the hierarchy of data structures.

Another embodiment of the invention includes an input port to receive an MC-DCT video stream. A monitor processor splits the MC-DCT video stream into a set of video streams. The monitor processor is configurable to alternately produce a set of video streams in accordance with a first partition according to functional sub-processes or a second partition according to a group-of-macroblocks.

The method of the invention includes the step of receiving an MC-DCT video stream with an associated hierarchy of data structures including a sequence data structure, a picture data structure, a slice data structure, and a macroblock data structure. The MC-DCT video stream is split into a set of video streams. The set of video streams are processed in accordance with an assigned computational task performed on a specified hierarchical level of the associated hierarchy of data structures. Each video stream is processed in accordance with a designated data structure including all parameter data required at the specified hierarchical level.

The invention provides a technique for efficiently scalable digital video decoding. In particular, the technique of the invention facilitates efficiency, synchronization, scalability, flexibility, and extended functionality in a video decoder.

The invention permits decoding of video streams (e.g., MPEG and other video streams with DCT and motion compensation) in a number of contexts. For example, the invention is advantageously exploited in connection with servers and workstations that provide multiprocessing capabilities. In particular, the invention is advantageously exploited in emerging servers and workstations that provide HDTV video decoders using symmetric multiprocessing techniques. The invention is also advantageously exploited in connection with multiprocessing system-on-a-chip architectures that are commercially available at this time, such as the MAJC-5200 from SUN MICROSYSTEMS, INC. and the IBM POWER4 from INTERNATIONAL BUSINESS MACHINES, INC. In addition, the invention can be exploited in connection with specialized ASICs that can use lower frequency, and hence lower power, designs.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
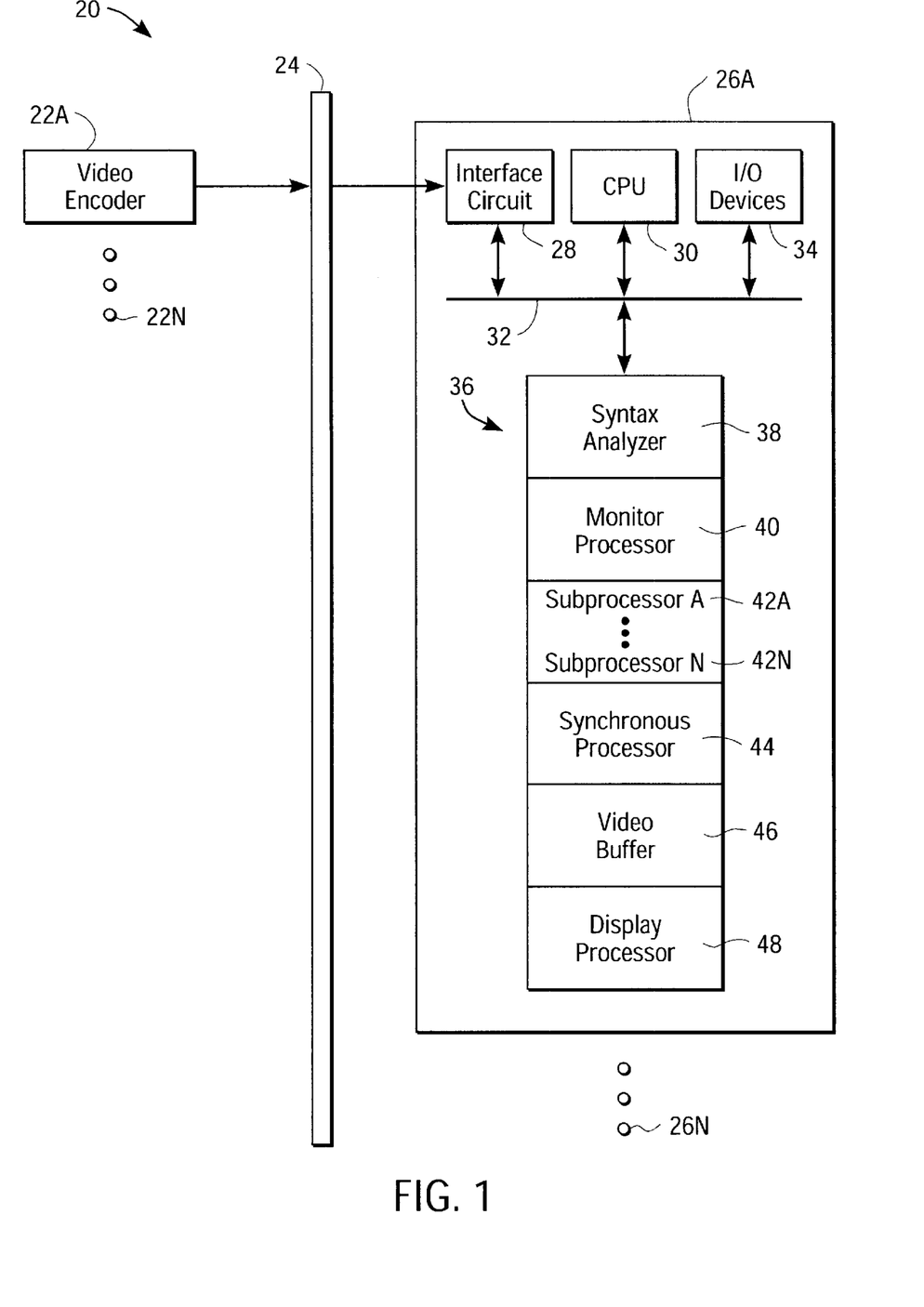
FIG. 1 illustrates a video decoding environment in which the apparatus of the invention operates.

FIG. 1 illustrate a video decoding environment 20 in which an embodiment of the apparatus of the invention operates. In particular, FIG. 1 illustrates a networked environment with a set of video encoders 22A–22N. Each video encoder 22 produces an encoded video signal which is applied to a transmission channel 24, which may be any wire or wireless transmission channel. A set of video decoders 26A–26N is also connected to the transmission channel 24. In the exemplary embodiment of FIG. 1, each video decoder 26 is implemented as a general purpose computer. Those skilled in the art will appreciate that dedicated decoder configurations may also be utilized in accordance with the invention.

In the example of FIG. 1, the video decoder 26 includes an interface circuit 28 to receive the encoded video signal from the transmission channel 24. The interface circuit 28 routes the encoded video signal to a central processing unit (CPU) 30 via a system bus 32. Also connected to the system bus is a set of input/output devices 34, which may include input devices, such as a mouse and keyboard, and output devices, such as a computer monitor, printer, and the like. The video decoder 26 also includes a system memory 36 connected to the system bus 32. The system memory 36, which may be primary and/or secondary memory, stores a set of executable programs utilized to implement the video decoding processes of the invention. In particular, the system memory 36 includes a syntax analyzer 38, a monitor processor 40, and a set of sub-processors 42A–42N. The sub-processors 42A–42N perform dedicated signal processing tasks, such as Bitstream Decoding and Inverse Quantization (BDIQ) processing, Inverse Discrete Cosine Transform (IDCT) processing, and Motion Compensation and Write Back (MCWB) processing.

The memory 36 also includes a synchronous processor 44, a video buffer 46, and a display processor 48. The display processor 48 coordinates the display of the encoded video signal on an output device of the set of input/output devices 34.

Figure 2:
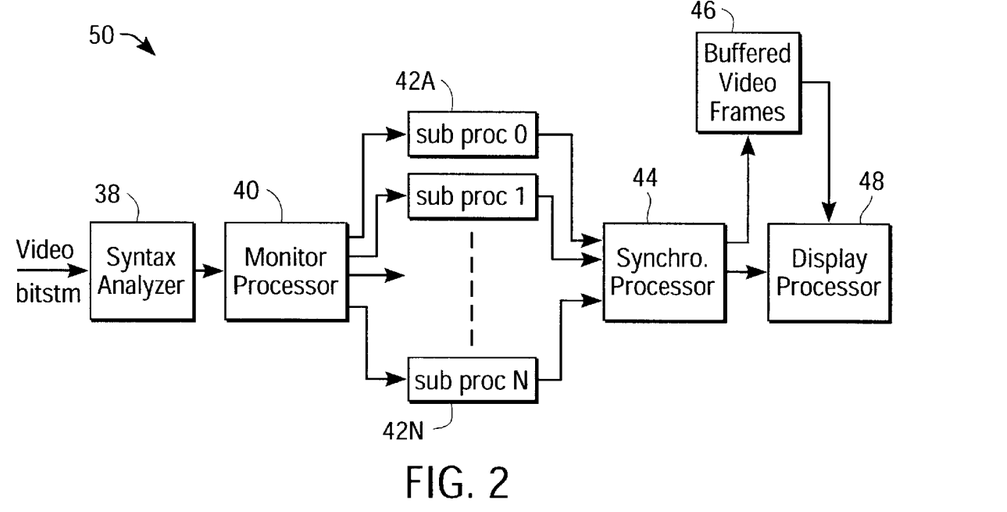
FIG. 2 illustrates a video decoder in accordance with an embodiment of the invention.

The operation of the executable modules stored in memory 36 are more fully appreciated with reference to FIG. 2, which illustrates a video decoder 50 in accordance with an embodiment of the invention. The video bit stream is sent to the syntax analyzer 38, which extracts all the picture header information, gets all the synchronization information from the bit stream and sends it to the monitor processor 40. The monitor processor 40, relying upon synchronization information from the syntax analyzer and system resources (hardware and/or software), splits the video decoding process into N independent sub-processes, for processing by the sub-processors 42A–42N. The synchronization processor 44 verifies the completion of the N independent sub-processes and sends a command to the display processor 48 to display one of the decoded video frames. If there is no need to buffer the decoded video frames, they can be directly sent to the display processor 48. In a typical video decoding system, the decoded frames may have to be re-ordered before they can be sent to the display processor 48. In such a case, the frame outputs from the synchronization processor are buffered in the video buffer 46 and the chosen buffered frame is then sent to the display processor 48.

The present invention is directed toward improving several aspects of the processing performed by the system of FIGS. 1 and 2. In particular, the invention is directed toward an improved syntax analyzer 38 for extracting information from the video bit stream. The invention is also directed toward an improved technique for splitting the video decoding process, as performed by the monitor processor 40. Another aspect of the invention is a set of improved data structures that allow different independent sub-processes to share information efficiently. In addition, the invention provides details on how to minimize overhead created by the synchronization process performed by the synchronization processor 44.

The architecture of the invention is equally applicable to both software and hardware based systems. For example, in a software implementation, the monitor processor 40 and synchronization processor 44 may refer to executable computer code modules, such as operating system function calls. In a hardware context, the monitor processor 40 and synchronization processor 44 may refer to a circuit for monitoring status bits and registers associated with a state machine. The underlying principles are identical, regardless of the implementation.

The invention is applicable to the processing of any MC-DCT video signal. By way of example, the invention is disclosed in connection with the processing of an MPEG-2 video signal. However, as will be appreciated by those skilled in the art, the invention is equally applicable to other MC-DCT formats, including: MPEG-1, MPEG-4, H.261, and H.263.

The following discussion provides the complete software architecture for a generic MC-DCT video decoder, with the definition of all the data structures and partitions, justification for some of the choices that were made, the overall program structure and some high-level pseudo code.

The architecture of the invention is optimized for a multi-processor environment (i.e., multiple CPUs 30 in each computer 26). As a result, emphasis is placed on developing a video decoder that is efficient in a multi-process environment. This focus resulted in a data structure and a process partition which are different than an implementation optimized for a uni-processor environment.

Data structures are one component of the invention. Data structures for different block communication and parameter passing have been chosen according to the bit stream hierarchy. Several factors were considered in determining the organization of these parameters. Some of the factors are: (1) implementing video decoding using multiple processes efficiently; (2) efficient argument passing between different compute blocks; (3) computational efficiency; (4) efficient data flow (minimal data replication); and (5) good data cache effects.

A hierarchy of data structures, depending on the level in which the parameters are applicable, is created in accordance with the invention. For example, for an MPEG-2 design, four kinds of data structures are defined: sequence, picture, slice and macroblock (group of blocks). Each MC-DCT standard has identical or directly analogous data structures.

One constraint utilized in accordance with the invention is that: "All parameter data that is needed at a certain level shall be accessible from the data structure defined for that level". One direct consequence of this constraint is that the video code with these data structures resulted in a very efficient argument passing structure. It was unnecessary to pass data structures from two different levels to a program block. Several parameters at the top most level are needed by the code in the lower most level. Due to the above mentioned constraint, the lower level code does not have any direct access to the upper level data structures.

Several smaller data structures were defined with some of the upper level parameters packed into these data structures. The pointer to these secondary data structures was included in the primary data structures. These secondary data structures were defined according to their access pattern in the low level code and not according to the order in which they were created in the bit stream. For example, the picture level parameters used only by the variable length decoding routine are combined into one data structure, parameters used only by the motion compensation routine are combined into another data structure and so on. This partition, in addition to having a very efficient data flow, significantly reduces the number of fields in the upper level data structures and hence, reduces the data bandwidth requirements of the video process.

Another technique utilized in accordance with the invention is that parameters in a data structure which are widely used by all the important processing blocks are included as fields in the data structure itself. Access to any parameter in a secondary data structure needs two levels of indirection: access to the secondary data structure and then the data field in the secondary data structure. This constraint is especially applicable to data structures in the lowest level. As a compute-vs-bandwidth compromise, an occasional parameter might be replicated in different data structures.

There is a potential problem in defining these secondary data structures whose fields are shared among several sub-processes. For example, a field in a secondary data structure that is currently being used by one sub-process could be overwritten by another sub-process. This could result in the first sub-process generating wrong and inconsistent data. To avoid this problem, two constraints are incorporated into the design:

1. The secondary data structures created by a higher level sub-process and its fields shall not be modified by any lower sub-process. For example, secondary data fields created at the picture level shall not be modified by the macroblock level sub-process.
2. Whenever the upper level data fields have to be updated, the monitor and synchronization processors shall ensure the completion of all lower level sub-processes which makes use of these data fields. By this constraint, when the upper level parameters are updated, it is ensured that there will be no lower level process that is running. Hence, it will be totally safe to update these fields.

The foregoing constraints allow the video process to have parameter data coherency among the sub-processes without losing other functions. In addition, by having these two constraints in the process partition, data coherency is achieved without any intervention from the monitor and synchronization processor 44. This is one of the principal factors by which a very efficient and scalable video decoding process is achieved.

Process partition is another important factor utilized in accordance with the invention. The way the video decoding process is partitioned dictates the nature of scalability and efficiency that can be achieved in this multi-process environment. There are two intuitive schemes in which the video decoding process can be partitioned:

1. Split the video decoding process into BDIQ, IDCT and MCWB sub-processes. With this partition, the decoding process can be pipelined in a way that the BDIQ sub-process is working on the (i+2) block, the IDCT is working on the (i+1) block while the MCWB is working on the i block.
2. Split the video decoding process into several Group-of-Macroblocks (GOM) level sub-processes. Synchronization headers may be inserted in the bit stream to identify independent portions of the bit stream. This partition overcomes some of the above mentioned disadvantages. Within the GOM-level sub-process, the Block/Macroblock operations are serial and hence, there is no need to spend any overheads for the synchronization processor. Before sending the decoded frame to the display unit, the synchronization processor can ensure that all the slice-level processes have finished execution. The overheads for this level of synchronization operation is minimal. In addition, in typical medium and high resolution video bit streams, there will be several synchronization headers and hence, the upper level code can dynamically choose the number of sub-processes that can be created depending on the system resources. Note that this partition is a function of the video bit stream. That is, there may or may not be synchronization headers in the bit stream. For example, in an MPEG-2 bit stream, it is ensured that there will be several synchronization headers (at least one for every Row of Macroblocks) within the picture data.

Figure 3:
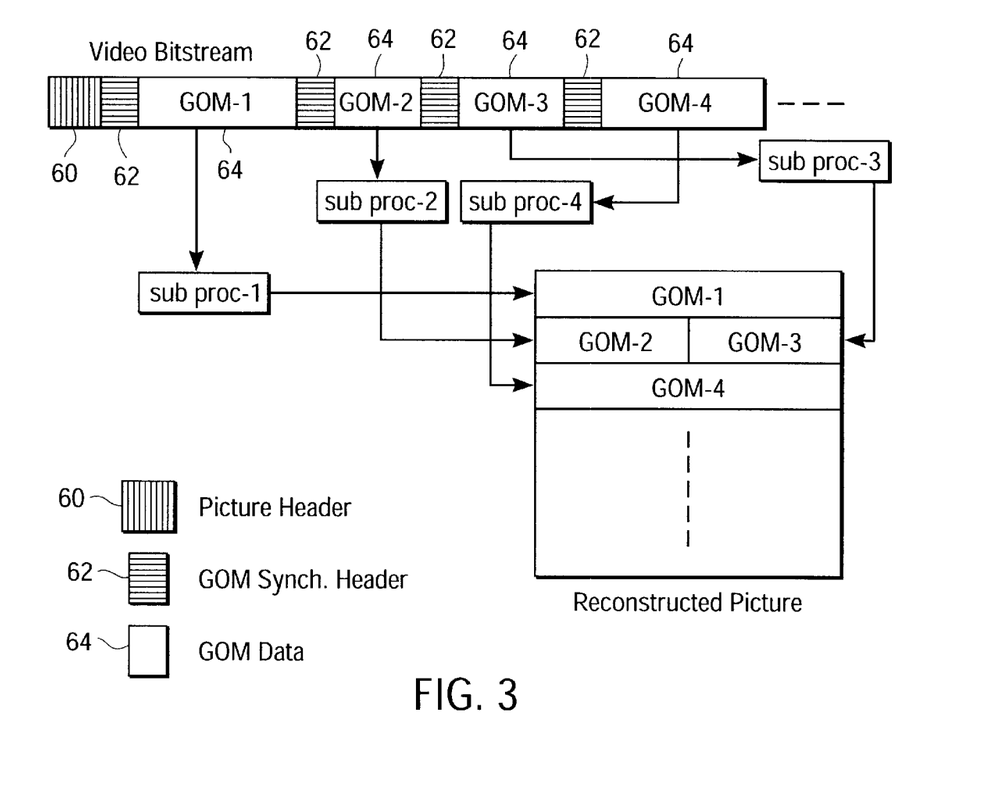
FIG. 3 illustrates group-of-macroblock processing performed in accordance with an embodiment of the invention.

A block diagram of the GOM based process partition is shown in FIG. 3. The figure illustrates a picture header 60, a GOM synchronization header 62, and GOM data 64. The syntax analyzer 22 extracts the upper-level headers and gathers information about the bit location of the synchronization headers (GOM headers) in the video bit stream along with the relative position of the respective GOM in the reconstructed picture. This information is needed so that each sub-process can independently process the GOM data.

It is desirable to have the flexibility of partitioning the video decoding process in both of the above mentioned ways. The monitor processor 40 can then adaptively choose the scheme which makes the most sense. In accordance with the invention, the following modifications are made to overcome some of the above mentioned disadvantages.

In a first scheme, to minimize the synchronization overhead, the video decoding pipeline is modified in such a way that, instead of sequentially doing BDIQ, IDCT and MCWB sub-processes for every macroblock, BDIQ is done for M number of macroblocks followed by M number of IDCT's and M MCWB's. The number M can be chosen statically or dynamically. This technique is described in the patent application entitled "Apparatus and Method for Scalable Buffering in a Digital Video Decoder", Ser. No. 09/517,804, filed May 2, 2000, which is incorporated by reference herein. By restructuring the video decoding process this way, the M-BDIQ, M-IDCT and M-MCWB sub-processes need to be synchronized only once every M macroblocks. This reduces the synchronization overheads by a factor of M.

In a second scheme, flexibility is provided to the monitor processor 40 to split the video decoding process into several group-of-GOM sub-processes. That is, instead of making a restriction that each sub-process will operate on only one GOM, the monitor process decides the number of GOMs in each sub-process dynamically. Since the number of macroblocks processed in each sub-process can therefore be approximately controlled, the compute balance between the different sub-processes can be more efficiently controlled. A data structure with information like the starting and stopping bit position for this sub-process along with the starting and the stopping macroblock addresses and so on are passed to the sub-process. More information on this data structure in a MPEG-2 framework is discussed below.

To support the second scheme, the BDIQ routines are modified to extract synchronization headers in addition to macroblock headers. The syntax analyzer 38 extracts all the needed information from the bitstream and provides it to the monitor processor 40. The monitor processor 40 then has the flexibility to split the picture decoding into multiple sub-processes. For example, in a dual-processor environment, it might be desirable to create no more than two partitions for picture decoding. The top half of the picture can be combined into a single sub-process, while the bottom half of the picture can be in the second sub-process. This allows for the two sub-processes to run asynchronously until the end when the synchronization processor 44 ensures their completion before sending the decoded frame to the display processor 48. This results in minimal synchronization overheads and hence, a very efficient scalable implementation.

Those skilled in the art will appreciate that although this architecture was designed for a multi-process environment, in view of some of the constraints introduced in the design, the overheads due to the multi-process requirements are minimal, so that the architecture of the invention can be efficiently deployed in a uni-process environment as well.

The foregoing discussion of the architecture of the invention is more fully appreciated in connection with the following discussion, which provides a more detailed disclosure of the implementation of the invention. The basic architecture of the system can be characterized as follows. A natural access point within a MC-DCT bit stream is a macro-block (MB). A MB has information about decoding a 16×16 area of a picture either independently or in combination with the past and/or future pictures in a temporal sequence. Each MB decode consists of three major steps: Inverse Quantization (BDIQ) processing, Inverse Discrete Cosine Transform (IDCT) processing, and Motion Compensation and Write Back (MCWB) processing. Each of these processing steps may have some video specific features. In some architectures it is desirable to perform inverse quantization with variable length decoding. Alternately, the inverse quantization may be followed by an inverse discrete cosine transform.

Independent execution of the VLD and IDCT routines for each MB provides a small granularity, but the overhead can be significant. As discussed, below the invention provides flexibility in deciding the granularity versus overhead trade-off.

Once the picture has been reconstructed with the luminance and chrominance components in different planes, the components have to be merged and color is converted to red, green, and blue (RGB) values. Between the reconstruction and color conversion lies the optional post-processing functions such as de-interlacing or filtering. In the following paragraphs a top-down view of the decoding process is given.

A group of MBs is referred to as a slice in MPEG. Although not a requirement, the common form of a slice is a row of MBs. Consider approximately 30 rows of MBs per a picture as forming a slice. A picture or "frame" needs to be decoded within a 24th, 25th, or 30th of a second depending on the source format. The pseudo-code for a picture looks like:

```
for_each_picture(struct pic_data *PicDataPtr)
{
initialize_tables_and_strctures(PicDataPtr);
while (!seqend)
{
getPicbits (PicDataPtr):
/* (PicDataPtr);
/* Extract bits for each picture and get Sync. info */
ExtPicHeader(PicDataPtr);
/* Extract Seq. GOP and Pic headers */
    if (!seqend) {
    DecompAndDisplayPic(PicDataPtr);
        }
    }
}
```

The getPicBits( ) function reads the video bit stream from the input buffer and extracts all the bits associated with a given picture to a separate buffer. This function also extracts all the slice header information so that the video decompression for each picture can be split into multiple threads and processed.

The ExtPicHeader( ) function extracts the video sequence, group of picture and picture level header information. The reason why the test for the End of Sequence is performed twice is the fact that some sequences might have no EOS header either due to some system problems or due to some video editing artifacts. At this stage, when no valid bit stream exists for the picture, the getPicBits( ) function writes an EOS header in the Picture Bitstream Buffer. The ExtPicHeader( ) function reads the EOS header and terminates the video decompression.

The DecompAndDisplayPic( ) function updates the frame pointers, decompresses the picture and sends the decoded picture for display. This functionality may be achieved with the following code.

```
DecompAndDisplayPic(structpic_data*PicDataPtr)
    {
    struct slice_data *SliceDataPtr[NTHREADS];
update_framepointer(PicDataPtr→PicFraIT~ePtr);
copypic_to_slice_data(PicDataPtr,SliceDataPtr);
        for (n=O; n<NTHREADS; n++)
        getSlices(SliceDataPtr[n]);
        StorePicture (PicDataPtr);
    }
```

The update_frame_pointer( ) function manipulates the frame pointers to extract the pointers for the current and the reference frames.

The copy_pic_to_slice_data( ) function copies all the information extracted at the Sequence, GOP (Group of Pictures) and Picture level headers to the Slice data structures. Some parameters are copied so as to avoid sharing data between multiple threads.

The getSlices( ) function processes one or more slices independently. Every invocation of the getSlices( ) function is independently processed. This allows the code to efficiently run the program in one MPU or on multiple MPUs.

The StorePicture( ) function takes the frame data, performs post-processing and routes the data for conventional color conversion and display. This function can be efficiently implemented as a separate process in such a way that while the current picture is being decompressed the previous picture can be displayed.

The following code also demonstrates the operation of the invention.

```
getSlices (struct slice_data *SliceDataPtr)
    {
    int MBA, NMb, MBAstart, MBAstop;
    struct mb_data *MBdataPtr[NMBLOCKS];
    copy.slice_to_MB_data(SliceDataPtr, MBdataPtr);
    intitalize_parameters(MBdataPtr);
        for (MBA=MBAstart; MBA<MBAstop;
            MBA = MBA+ NMBLOCKS) {
        /* boundary condition */
        if ((MBA+NMBLOCKS-1) < (MBAstop)) {
        NMb = NMBLOCKS;
        }
        else {
        NMb = (MBAstop) -MBA;
        }
        NPrevious = NMBLOCKS -1;
    /* need a pointer to the previousMB data for
prediction */
            getBDIQ_M(MBdataPtr,NMb, NPrevious);
            getIDCT_M (MBdataPtr, NMb);
            reconstruct_MCWB_M(MBdataPtr,NNb);
            }
    }
```

In the foregoing code, the processing blocks are always for NMBLOCKS Macro-blocks, except the Boundary cases. The getPicBits( ) function in this proposal operates on a picture data at a time and gets the starting and stopping bitstream location in the bitstream buffer. It can be programmed to operate on a slice by slice basis as well (where NMBLOCKS=1).

Here, the flexibility exists such that one MPU processes the even slices and the other processes the odd slices. There is an inherent problem in such a division. It is possible to have multiple slices in a row of Macroblocks. If that is the case, then the meaning of even and odd slices is not clear. To avoid this confusion and other problems as well, MBAstart and MBAstop parameters have been included in the Slice Structure so that the picture processing can be split using multiple CPUs. By including these parameters, there are multiple ways in which this code can be divided to process using two MPUs. It is guaranteed in MPEG-2 that every row of MBs start with a slice header.

The final option is to create a map table with the getPicBits( ) function such that the number of Macroblocks in each iteration can be dynamically changed. The advantages and the disadvantages of these options are discussed below in connection with the general control flow code.

Attention now turns to the overall control flow and variable length decoding utilized in accordance with an embodiment of the invention. All the Slice and Macroblock Header extraction is done by the function getBDIQ_M( ) including VLD for NMBLOCKS Macroblocks. Since operations like Intra block DC prediction and Motion Vector Prediction requires information from the previous Macroblock parameters, the copyMBparam( ) function copies the parameters of the previous Macroblock to the current Macroblock parameters. These parameters may get updated by the getMB( ) function. The use of this function can be avoided by using some additional control code in the individual functions.

```
getBDIQ_M(struct mb_data *MBdataPtr[ ], int NMb, int
NPrevious)
{
int NPrev,nmb;
    NPrev = NPrevious;
    for (nmb=O; nmb<NMb; nmb++) {
        copyMEparam (MBdataPtr [NPrev],
        MBdataPtr [nmb]);
        getMB(MBdataPtr [nmb]);
        NPrev = nmb;
    }
}
```

In the getBDIQ function, operations are performed for parameter extraction, dc-prediction, VLD, IQ and mismatch control for a specific standard. Documents for the individual standards specify the operations to be performed.

The ExtractMBheader( ) function extracts the MB type, Motion type, DCT type, Quantization Scale, Motion Vectors and the Coded Block Pattern. The overall structure of this code is shown below.

```
ExtractMBheader (struct rub_data *MBdataptr)
{
    getMBtype (MBdataPtr);
    if (MV_present) getMotionType (MBdataPtr);
    getDctType(MBdataPtr);
    if (MB_QUANT) getQuantScale(MBdataptr);
    if (MV_PRESENT)
        for (i=O; i<No_of_MV; i++)
            getMotionVectors(MBdataPtr, i);
    }
    getCBP(MBdataPtr);
}
```

The MV_present flag can be obtained from the Macroblock type, the picture structure (frame or field) and the presence of concealment motion vectors. The motion type and the Motion Vectors are extracted only when necessary. The Quantization Scale is extracted when the Macroblock type indicates its presence. There may be as many as 4 Motion Vectors in a MB depending on the Motion type. The getMotionVectors( ) function also extracts the delta Motion Vectors for the dual prime option.

All the header extraction functions might make use of some general-purpose bit stream extraction routines to extract variable length bit fields. It is possible that the functionalities of these general-purpose functions might be embedded in other functions without explicitly calling these routines. For example, calling a function like getbits( ) will not be very efficient for extracting VLD coefficients, but might be sufficient for a function like ExtractSliceHeaders( ).

General-purpose bit manipulation functions utilized in accordance with the invention include:

"showbits( )": this function, depending on the bit-offset, shows a field of size num_of_bits. This function uses the BitExtract instruction. "getbits( )": this function, depending on the bit-offset, extracts a field of size num_of_bits. This function uses the BitExtract instruction. It also updates the parameter which has the offsets.

"skipbits( )": this function updates offsets.

Attention now turns to inverse quantization and inverse DCT processing performed in accordance with an embodiment of the invention. The IQ and IDCT may be combined for MPEG-2, while the IQ may be implemented with VLD for MPEG-I. The structure of the getMBiqIDCT_N( ) function is as shown below.

```
getMBiqIDCT_N (struct mb_data *MBdataPtr[ ], int NMb)
{
    for (nmb=O; nmb<NMb; nmb++) {
        if(MBdataPtr[nmb]->cbp !=O) {
            getIDCT(MBdataPtr[nmb]); }
    if(mpeg2)getMBmp2iq_IDCT(MBdataPtr[nmb]);
            else getMBmpl_IDCT(MBdataPtr[nmb]);
        }
    }
}
```

Attention now turns to motion compensation and block reconstruction performed in accordance with an embodiment of the invention. The Motion Compensation, Block Reconstruction (the portion which adds the IDCT coefficients to the Motion Compensated data) and the final placement of the reconstructed block to its proper location in the 2-D frame buffer in memory is done by the MCWB_N( ) function. The MCWB_N( ) function computes the same for N Macroblocks, where the value of N is provided by the getSlices( ) routine and is shown below.

```
MCWB_N(struct mb_data *MbdataPtr[ ], int NMb)
{
    for (nmb=O; nmb<NMb; nmb++) {
        MCWB_N (MBdataPtr[nmb]);
    }
}
```

Attention now turns to the interface definition utilized in accordance with an embodiment of the invention. The interfaces for different inter and intra block communication and parameter passing have been carefully chosen with the disclosed architecture in mind. In particular, the interfaces are classified according to the bitstream hierarchy. That is, four kinds of data structures are defined: sequence, picture, slice and macroblock level data structures. Those skilled in the art will appreciate that these data structures are especially applicable to MPEG-1 and MPEG-2. However, these data structures may also be generalized for any MC-IDCT system.

Several factors were considered to decide on how the parameters were organized in these data structures. Some of the factors are: implementing video decoding using multiple threads, efficient argument passing, computational efficiency, efficient data flow, and instruction and data cache effects.

Since Slices are independent data units in video streams, it makes logical sense to define slice-level structures where all the parameters that are needed for processing individual Macroblocks are arranged. This avoids the situation of multiple processes trying to access the same parameter data.

The Macroblock header has several parameters that are needed by the various processing units. Any given processing unit (for example, Motion Compensation) needs only a subset of these parameters. A Macroblock structure is defined in such a way that all the parameters needed for Macroblock processing can be found in the MB data structure.

In addition, there are several parameters which were extracted from the picture, sequence and GOP headers which are needed for processing an individual MB. Several smaller data structures are defined and a pointer to these data structures is included in the Slice and MB data structures. For example, parameters like Picture Horizontal Size and so on are extracted from Picture headers and extensively used for MB processing (Motion Compensation). Instead of having a copy of this parameter in every Slice and Macroblock structure, parameters like Horizontal and Vertical Size are grouped together into another data structure (for example, PicParameters) and a pointer to this structure is included in every Slice and MB structure. Such an idea is also used to minimize the number of fields in the Slice and MB structures. The number of fields in a MB structure is an issue because a big MB structure will significantly increase the data bandwidth.

Having two levels of indirection may not be desirable for some parameters which are extensively used by all the processing blocks. A parameter like the Coded Block Pattern (CBP) is used in multiple processes. It may not be computationally efficient for each processing unit to go through two levels of indirection to access this particular parameter. As a result, some parameters which change on a Macroblock basis and are widely used are included in the MB structure. On the same note, parameters which are not as frequently used are combined into a data structure which makes the most sense. Some of the parameters can be packed into a single parameter without a loss in performance.

Based on the above mentioned guidelines, data structures used in accordance with the invention are shown below. These data structures are disclosed in the context of an MPEG-2 implementation of the invention. Naturally, implementation of the invention in connection with a different standard will result in modified code. The Picture level data structure is as follows:

```
typedef struct pic_data {
    int VideoType;
    PictureStrPtr *PicStream
    int temp_ref;
    int vbv_delay;
    int altscan;
    unsigned char *zscanPtr;
    MVecMisc *mvparam;
    Picparam *picparam;
    PicBlockParam *picBlockparam;
    PicFrame *picFramePtr;
        unsigned char *defIntraQuantMat;
        PicSync *picSyncptr;
        vlcptr      *vlcPtr;
};
```

VideoType specifies the MC-DCT video stream to be processed.

PictureStrPtr is the pointer to the picture level bit stream structure which is defined as follows:

```
typedef struct PictureStrPtr {
int *startPtr /* Starting word add.ofPic Stream */
int *start_bit_offset /*bit offset for thestart*/
int *stopPtr /* Last word add. of the Pic Stream */
int stopbit_offset /* bit offset for the stop*/
int *currPtr; /* The address of the current word */
int incnt; /* The bit offset */
};
```

The last word address of the final byte of the bitstream for the current picture is also included in error conditions. It is currently assumed that the picture level bitstreams are stored in a linear buffer. It is the responsibility of the upper level code to ensure this condition. temp_ref is the temporal reference of the current picture as specified by the MPEG standard. vbv_delay is a parameter as specified by the MPEG standard. The altscan parameter, if set, specifies the use of the alternate scan method according to the MPEG-2 standard.

MPEG-2 bitstreams can use two scan techniques. Depending on whether zig-zag scan or alternate scan is used, the order in which the coefficients are processed in VLD is different. This choice can be made only at the Picture coding level. In addition, the IDCT also needs the block data at a different order. Hence, the reordering required by one of the scan techniques and the IDCT are combined and the combined ordering information is provided in a memory location pointed by the ScanPtr. This is the only ordering pointer required by the VLD unit. The zig-zag-scan order is also provided using zscanPtr due to the fact that the user defined Quantization matrix always uses zig-zag scan order.

Some parameters from the picture header are used for Motion Vector decoding. The MvecMisc gathers these parameters and is defined below. The fullforw and full_back parameters are used to indicate if the Motion Vectors are full or half resolution. The r_si Z e parameters are used to decode Motion Vectors.

```
typedef struct {
    int full_forw;
    int full_back;
    int h_forw_r_size;
    int v_forw_r_size;
    int h_back_r_size;
    int v_back_r_size;
} MVecMisc;
```

PicParam contains all the different picture-level parameters that are also needed at the MB level and is defined below.

```
typedef struct {
    int horizontal_size;
    int vertical_size;
    int code_picture_width;
    int code&_pictureheight;
    int pict type;
    int pictstruct;
    int progframe;
    int prog_seq;
    int chrorna_format;
    int framepred_dct;
    int conceal_my;
    int repeatfirst;
    int topfirst;
    int secondfield;
} PicParam;
```

PicBlockParam contains parameters extracted at the picture level headers and is needed at the block level for VLD and IQ units. These parameters can be merged with PicParam if there is no performance degradation. The intended use of these fields can be found in the MPEG-2 Video Specification.

```
typedef struct {
    int dc_prec;
    int intravlc;
    int qscale_type;
```

```
            int *ScanPtr;
            int *intraQuanMatPtr;
            int *interQuanMatPtr;
    } PicBlockParam;
```

The PicFrame structure defines the starting address of all the frames that are needed for MPEG-2 decoding.

InterQuantMatptr and IntraQuantMatPtr are the pointers to the inter and intra Quantization matrices.

PicSync contains the Synchronization information from the get-Picsits( ) function. This information is need to split the processing into multiple threads. Information like the starting bit location for the slice, vertical location of the slice and so on is gathered here. This particular structure has been successfully used to split the picture bit stream to two threads: Top half and Bottom half of the picture.

```
    typedef structure {
            int MBA_bit_pos;
            int MBA_mid_bc;
            int MBA_bit_end;
            int MBAxnax;
```

The MBA_bi_tpos specifies the bitoffset from the top of the picture buffer to the beginning of the first Slice in the Middle row macroclocks. The MBA_mid_bc gives the macroblock address of the first macroblock in the middle row macroblocks. The MBA_bit_end gives the bitoffset for the last bit for the current picture. MBAmax gives the total number of macroblocks in the current picture. vlcptr defines all the VLC tables needed by the bit stream. It is defined as follows.

```
    typedef struct
            VLCtab *PMBtab;
            VLCtab *BMBtab;
            VLCtab *MVtab;
            VLCtab *CBPtab;
            VLCtab *MBAtab;
            VLCtab *DCchromtab;
            DCTtab *DCTtab;
            DCTtab *DCTtabO;
            unsigned char *nl_mquant_table;
    } vlcptr;
```

The use of the foregoing tables is specified in the MPEG-2 Video standard.

The slice data structure, as shown below, is defined in such a manner that an arbitrary number of slices can be processed using a single structure.

```
    typedef struct slice_data {
            SliceStrptr *btstream;
            int MBAstart;
            int MBAstop;
            int VideoType;
            MvecMisc *mvparam;
            PicParam *picparam;
            PicBlockparam *picBlockParm;
            PicFrame   *PicFramePtr;
            vlcptr    *vlcPtr;
    } SliceData;
```

SliceStrptr is the pointer which has the information on the current location of the bitstream, the bitoffset and so on for the current slice. The bitstream for any given slice is always assumed to be in a linear buffer. The structure that is used is shown below.

```
    typedef struct
            int *rdptr; 1* The address of the current word *1
            int incnt; 1* The bit offset *1
    } SliceStrPtr;
```

The parameters MBAstart and MBAstop specify the starting and stopping MBA respectively. The Macroblock structure is shown below.

```
    typedet struct mb_data {
            SliceStrPtr *btstream;
            int MBA; mt MBAinc;
            int VideoType;
            int cbp;
            int m&type;
            int motion_type;
            int dcttype;
            int quantscale;
            short *input blocks;
            short *output_blocks;
            short *scaledmatx;
            MB_Idct_Misc *mb_idctPtr;
            MVecPtr *mvec;
            MVecMisc *mvpar;
            PicParam *picparajn;
            PicBlockParam *picBlockparam;
            PicFrame *picFramePtr;
            vlcptr *vlcPtr;
            int intra slice;
    } MBstruc;
```

MBA is the global Macroblock Address (the address of the Macroblock with respect to the picture and not the slice) of the current Macroblock. MBAinc is the MB address increment used to account for the skipped Macroblocks. The fields cbp, mb_type, motion_type, dct_type and quantscale are as specified by the MPEG-2 Video Specification.

The pointer *input_blocks points to the starting location of 6 blocks of 64 short integers which are used to store the output of the VLD unit. The pointer *output_blocks points to the starting location of 6 blocks of 64 short integers which are used to store the output of the IQ/IDCT unit. *scaled_matx points to the scaled Quantization matrix used by the IQ unit for Inverse Quantization.

The MB_Idct_Misc structure contains all the miscellaneous information needed by the IQ and IDCT units. It is defined as follows:

```
    typedef structure MB_IdctMisc {
            int continue_bit;
            int *intradcdpcm;
            float    *scratch;
            float    *idct_constants;
    };
```

The continue_bit is used to indicate whether it is a continued call (0) or is being called for the first time. This avoids reloading of the IDCT constant values. The *intra_dcd_pcm points to the past intra DC values for DC prediction. *scratch is a pointer to a scratch area of 3*256 bytes of memory used for storing the intermediate IDCT values.

*idct_constants is a pointer to the memory where the IDCT constants are stored. MVecPtr is a data structure which contains information like the Motion Vectors and the Motion Vector field select parameters. The way the Motion Vectors are stored is shown below.

```
typedef struct rnvecPtr {
    short int Mv;
    short int dmvector;
    short int mv_field_sel;
};
```

Currently, MV is a three dimensional array of short integer values. The first dimension specifies the top and bottom motion vectors, the second dimension specifies if it is a forward and backward motion vector and the final dimension refers to the horizontal or vertical component. This can be easily modified to a two-dimensional array of integer values, where each integer has both horizontal and vertical components.

dinvectar is used to temporarily store the delta motion vectors for the dual-prime option. Since the dual-prime option never exists with B-pictures, the dual-prime vectors are stored in the same location as backward motion vectors. All motion vectors have a half-pixel resolution.

The my_field_sel parameter is used to specify which reference field is used for prediction. The intra_slice field specifies if all the Macroblocks of the current slice are Intra Macroblocks.

Those skilled in the art will recognize a number of advantages associated with the invention. The invention permits decoding of video streams (e.g., MPEG and other video streams with DCT and motion compensation) in a number of contexts. For example, the invention is advantageously exploited in connection with servers and workstations that provide multiprocessing capabilities. In particular, the invention is advantageously exploited in emerging servers and workstations that provide HDTV video decoders using symmetric multiprocessing techniques. The invention is also advantageously exploited in connection with multi-processing system-on-a-chip architectures that are commercially available at this time, such as the MAJC-5200 from SUN MICROSYSTEMS, INC. and the IBM POWER4 from INTERNATIONAL BUSINESS MACHINES, INC. In addition, the invention can be exploited in connection with specialized ASICs that can use lower frequency, and hence lower power, designs.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An apparatus for decoding a Motion Compensated-Discrete Cosine Transform (MC-DCT) video stream, comprising:

an input port to receive an MC-DCT video stream with an associated hierarchy of data structures including a sequence data structure, a picture data structure, a slice data structure, and a macroblock data structure;

a monitor processor to split said MC-DCT video stream into a set of video streams and to create a set of shared data structures that includes parameter data required at more than one hierarchical level of the associated hierarchy of data structures; and a set of sub-processors to process said set of video streams, each sub-processor having an assigned computational task performed on a specified hierarchical level of said associated hierarchy of data structures, each sub-processor of at least a subset of the set of sub-processors configured to access at least one data structure of the set of shared data structures, whereby said sub-processor does not have to access a different hierarchical level of the hierarchy of data structures than the specified hierarchical level to complete the assigned computational task.

2. The apparatus of claim 1 wherein said set of sub-processors include a sub-processor to perform variable length decoding in connection with said picture data structure utilizing a designated shared data structure including parameter data required to perform said variable length decoding.

3. The apparatus of claim 1 wherein said set of sub-processors include a sub-processor to perform motion compensation in connection with said picture data structure utilizing a designated shared data structure including parameter data required to perform said motion compensation.

4. An apparatus for decoding a Motion Compensated-Discrete Cosine Transform (MC-DCT) video stream, comprising:

an input port to receive an MC-DCT video stream with an associated hierarchy of data structures including a sequence data structure, a picture data structure, a slice data structure, and a macroblock data structure;

a monitor processor to split said MC-DCT video stream into a set of video streams and to create a set of shared data structures that includes parameter data required at more than one hierarchical level of the associated hierarchy of data structures;

a set of sub-processors to process said set of video streams, each sub-processor having an assigned computational task performed on a specified hierarchical level of said associated hierarchy of data structures; and a synchronous processor to combine said set of video streams received from said set of sub-processors, said synchronous processor ensuring that parameters, produced by a sub-processor associated with a lower hierarchical level of said hierarchy of data structures and affecting one or more shared data structures of the set of shared data structures, are final prior to modifying said parameters with values produced by a sub-processor at a higher hierarchical level of said hierarchy of data structures.

5. The apparatus of claim 4 wherein said synchronous processor ensures that parameters produced by a sub-processor operating at a macroblock data structure hierarchical level are final prior to modifying said parameters with values produced by a sub-processor operating at a picture data structure hierarchical level.

6. A method of decoding a Motion Compensated-Discrete Cosine Transform (MC-DCT) video stream, said method comprising the steps of:
- receiving an MC-DCT video stream with an associated hierarchy of data structures including a sequence data structure, a picture data structure, a slice data structure, and a macroblock data structure;
- splitting said MC-DCT video stream into a set of video streams;
- creating a set of shared data structures that includes parameter data required at more than one hierarchical level of the associated hierarchy of data structures; and
- processing said set of video streams, each video stream of said set of video streams being processed in accordance with an assigned computational task performed on a specified hierarchical level of said associated hierarchy of data structures, said processing utilizing parameter data from the set of shared data structures so as not to have to access a data structure at a hierarchical level different than the specified hierarchical level to complete the assigned computational task.

7. The method of claim 6 wherein said processing step includes the step of processing each video stream with a designated shared data structure including parameter data required to perform variable length decoding.

8. The method of claim 7 wherein said processing step includes the step of processing said picture data structure utilizing a designated shared data structure including parameter data required to perform motion compensation.

9. An apparatus for decoding a Motion Compensated-Discrete Cosine Transform (MC-DCT) video stream, comprising:
- an input port to receive an MC-DCT video stream with an associated hierarchy of data structures including a sequence data structure, a picture data structure, a slice data structure, and a macroblock data structure;
- a monitor processor to split the MC-DCT video stream into a set of video streams and to create a set of primary data structures corresponding to the hierarchy of data structures associated with the MC-DCT video stream; and
- a set of sub-processors to process the set of video streams, each sub-processor having an assigned computational task performed on a specified hierarchical level of the associated hierarchy of data structures, each sub-processor performing the assigned computational task utilizing the primary data structure of the set of primary data structures corresponding to the specified hierarchical level;
- wherein all parameter data required to complete the assigned computational task at a specified hierarchical level is accessible from the primary data structure corresponding to the specified hierarchical level;
- wherein the monitor processor further creates a set of secondary data structures, the set of secondary data structures including parameter data required at more than one hierarchical level of the associated heirarchy of data structures.

10. The apparatus of claim 9, wherein more than one primary data structure of the set of primary data structures accesses the same secondary data structure of the set of secondary data structures.

11. The apparatus of claim 9, wherein more than one primary data structure of the set of primary data structures includes a pointer to the same secondary data structure of the set of secondary data structures.

12. The apparatus of claim 9, further including a synchronous processor to combine the set of video streams received from the set of sub-processors, the synchronous processor ensuring that parameters produced by a sub-processor associated with a lower hierarchical level of the hierarchy of data structures, and affecting one or more data structures of the set of secondary data structures, are finalized prior to modifying the parameters with values produced by a sub-processor at a higher hierarchical level of said hierarchy of data structures.

13. A method of decoding a Motion Compensated-Discrete Cosine Transform (MC-DCT) video stream, said method comprising the steps of:
- receiving an MC-DCT video stream with an associated hierarchy of data structures including a sequence data structure, a picture data structure, a slice data structure, and a macroblock data structure;
- splitting said MC-DCT video stream into a set of video streams; and
- creating a set of primary data structures corresponding to the hierarchy of data structures associated with the MC-DCT video stream;
- processing said set of video streams, each video stream of said set of video streams being processed in accordance with an assigned computational task performed on a specified hierarchical level of said associated hierarchy of data structures, each video stream being processed in accordance with a designated primary data structure that provides access to all parameter data required to complete the assigned computational task at the specified hierarchical level;
- creating a set of secondary data structures, the set of secondary data structures including parameter data required at more than one hierarchical level of the associated hierarchy of data structures.

14. The method of claim 13, wherein more than one primary data structure of the set of primary data structures accesses the same secondary data structure of the set of secondary data structures.

15. The method of claim 14, further including:
- combining the set of video streams received from the set of sub-processors; and
- ensuring that parameters produced by a sub-processor associated with a lower hierarchical level of the hierarchy of data structures, and affecting one or more data structures of the set of secondary data structures, are finalized prior to modifying the parameters with values produced by a sub-processor at a higher hierarchical level of said hierarchy of data structures.

* * * * *